(12) United States Patent
Thebault et al.

(10) Patent No.: US 11,159,700 B2
(45) Date of Patent: Oct. 26, 2021

(54) METHOD AND DEVICE FOR COLOR GAMUT MAPPING

(71) Applicant: InterDigital VC Holdings, Inc., Wilmington, DE (US)

(72) Inventors: Cedric Thebault, Cesson-Sevigne (FR); Jonathan Kervec, Cesson-Sevigne (FR); Angelo Mazzante, Cesson-Sevigne (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 67 days.

(21) Appl. No.: 16/499,839

(22) PCT Filed: Mar. 30, 2018

(86) PCT No.: PCT/EP2018/058353
§ 371 (c)(1),
(2) Date: Sep. 30, 2019

(87) PCT Pub. No.: WO2018/178367
PCT Pub. Date: Oct. 4, 2018

(65) Prior Publication Data
US 2020/0106928 A1    Apr. 2, 2020

(30) Foreign Application Priority Data

Mar. 31, 2017    (EP) .................................... 17305384

(51) Int. Cl.
*H04N 1/60*    (2006.01)

(52) U.S. Cl.
CPC ......... *H04N 1/6066* (2013.01); *H04N 1/6075* (2013.01)

(58) Field of Classification Search
None
See application file for complete search history.

(56) References Cited

U.S. PATENT DOCUMENTS 6,882,445 B1    4/2005    Takahashi et al.
9,478,046 B2    10/2016   Ohishi et al.
(Continued)

FOREIGN PATENT DOCUMENTS

CN    1753452 A    3/2006
EP    3110124 A1    12/2016
(Continued)

OTHER PUBLICATIONS

JP2006345187 A, Translated "Color processing method and device thereof" Dec. 21, 2016.
(Continued)

*Primary Examiner* — Aaron M Richer
(74) *Attorney, Agent, or Firm* — Invention Mine LLC

(57) ABSTRACT

The present principles relate to a method and device for gamut mapping from a first color gamut towards a second color gamut. The method comprises obtaining a preserved key color (prsv_color$_{K0}$) and a hue alignment angle ($\theta_{K0}$) of the key color (color$_{K0}$) for each key color (color$_{K0}$) of at least 3 key colors to define a preserved gamut and a rotated gamut; and performing a hue mapping of a current color (color) from the first color gamut towards the second color gamut wherein in case the current color (color) is in a preserved gamut defined by the preserved key color (prsv_color$_{K0}$), the hue mapped current color is unchanged, and in case the current color is out of the preserved gamut, the hue mapped current color is calculated from the hue alignment angle ($\theta_{K0}$) of two adjacent key colors of the current color (rotated gamut) and from the preserved area.

13 Claims, 9 Drawing Sheets

(56) References Cited

U.S. PATENT DOCUMENTS

| | | | |
|---|---|---|---|
| 2005/0248784 A1 | 11/2005 | Henley et al. | |
| 2019/0158894 A1* | 5/2019 | Lee | H04N 19/70 |

FOREIGN PATENT DOCUMENTS

| | | | |
|---|---|---|---|
| JP | 2006345187 A | 12/2006 |
| JP | 2013223053 A | 10/2013 |
| JP | 2016067002 A | 4/2016 |
| WO | 2016184831 A1 | 11/2016 |
| WO | 2016206981 A1 | 12/2016 |
| WO | 2017019818 A1 | 2/2017 |

OTHER PUBLICATIONS

JP2016067002 A, Translated "Color gamut conversion device and color gamut conversion method" Apr. 28, 2016.

Diaz, R., et al. "Integrating HEVC video compression with a high dynamic range video pipeline." SMPTE Motion Imaging Journal 125, No. 1 (2016): 14-21.

François, E., et al. "A single-layer HDR video coding framework with SDR compatibility." (2016): 15-10.

Braun, G., et al. "Image lightness rescaling using sigmoidal contrast enhancement functions." Journal of Electronic Imaging 8, No. 4 (1999): 380-394.

"High-Performance Single Layer Directly Standard Dynamic Range (SDR) Compatible High Dynamic Range (HDR) System for use in Consumer Electronics devices (SL-HDR1)" ETSI Telecommunications company, EBU Operating Eurovision ETSI TS 103 433 2 V1.1.1 (Aug. 2016).

ITU-T Study Group. "Series H: Audiovisual and multimedia systems: Infrastructure of audiovisual services—coding of moving video." ITU-T Study Group,"Series H: Audiovisual and multimedia systems: Infrastructure of audiovisual services—coding of moving video," in General Secretariat and Telecom Radiocommunication (ITU-R) Standardization (ITU-T), sec. H 265 (2005).

Standard, S. M. P. T. E "High dynamic range electro-optical transfer function of mastering reference displays." SMPTEST 2084 (2014): 1-14.

Lee, C., et al. "Gamut mapping using variable anchor points." In Color Imaging: Device-Independent Color, Color Hardcopy, and Graphic Arts IV, vol. 3648, pp. 129-139. International Society for Optics and Photonics, 1998.

Masaoka, K., et al. "Algorithm design for gamut mapping from UHDTV to HDTV." Journal of Display Technology vol. 12, No. 7 (2016): 760-769.

* cited by examiner

METHOD AND DEVICE FOR COLOR GAMUT MAPPING

This application claims the benefit, under 35 U.S.C. § 365 of International Application PCT/EP2018/058353, filed Mar. 30, 2018, which was published in accordance with PCT Article 21(2) on Oct. 4, 2018, in English, and which claims the benefit of European Patent Application No. 17305384.4, filed Mar. 31, 2017.

1. FIELD

The present principles generally relate to image/video coding/decoding. Particularly, but not exclusively, the technical field of the present principles are related to color gamut mapping of an image whose pixels values belong to a high-dynamic range and inverse gamut mapping of an image whose pixels values belong to a low-dynamic range.

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

In the following, an image contains one or several arrays of samples (pixel values) in a specific image/video format which specifies all information relative to the pixel values of an image (or a video) and all information which may be used by a display and/or any other device to visualize and/or decode an image (or video) for example. An image comprises at least one component, in the shape of a first array of samples, usually a luma (or luminance) component, and, possibly, at least one other component, in the shape of at least one other array of samples, usually a chroma component. Or, equivalently, the same information may also be represented by a set of arrays of color samples, such as the traditional tri-chromatic RGB representation.

A pixel value is represented by a vector of C values, where C is the number of components. Each value of a vector is represented with a number of bits which defines a maximal dynamic range of the pixel values.

Low-Dynamic-Range images (LDR images) are images whose luminance values are represented with a limited number of bits (most often 8 or 10). This limited representation does not allow correct rendering of small signal variations, in particular in dark and bright luminance ranges. In high-dynamic range images (HDR images), the signal representation is extended in order to maintain a high accuracy of the signal over its entire range. In HDR images, pixel values representing luminance levels are usually represented in floating-point format (either 32-bit or 16-bit for each component, namely float or half-float), the most popular format being openEXR half-float format (16-bit per RGB component, i.e. 48 bits per pixel) or in integers with a long representation, typically at least 16 bits.

The arrival of the High Efficiency Video Coding (HEVC) standard (ITU-T H.265 Telecommunication standardization sector of ITU (October/2014), series H: audiovisual and multimedia systems, infrastructure of audiovisual services—coding of moving video, High efficiency video coding, Recommendation ITU-T H.265) enables the deployment of new video services with enhanced viewing experience, such as Ultra HD broadcast services. In addition to an increased spatial resolution, Ultra HD can bring a wider color gamut (WCG) and a higher dynamic range (HDR) than the Standard dynamic range (SDR) HD-TV currently deployed. Different solutions for the representation and coding of HDR/WCG video have been proposed (SMPTE 2014, "High Dynamic Range Electro-Optical Transfer Function of Mastering Reference Displays, or SMPTE ST 2084, 2014, or Diaz, R., Blinstein, S. and Qu, S. "Integrating HEVC Video Compression with a High Dynamic Range Video Pipeline", SMPTE Motion Imaging Journal, Vol. 125, Issue 1. February, 2016, pp 14-21).

SDR backward compatibility with decoding and rendering devices is an important feature in some video distribution systems, such as broadcasting or multicasting systems.

Dual-layer coding is one solution to support this feature. However, due to its multi-layer design, this solution is not adapted to all distribution workflows.

An alternative is a single Layer HDR distribution solution as defined by the ETSI recommendation ETSI TS 103 433. The reader may also refer to the IBC 2016 article ("A single-Layer HDR video coding framework with SDR compatibility", E. Francois and L. Van de Kerkhof, IBC 2016) for more details. This single layer distribution solution is SDR compatible and leverages SDR distribution networks and services already in place. It enables both high quality HDR rendering on HDR-enabled CE (Consumer Electronics) devices, while also offering high quality SDR rendering on SDR CE devices.

This single layer distribution solution is based on a single layer coding/decoding process and is codec independent (a 10 bits codec is recommended).

This single layer distribution solution uses side metadata (of a few bytes per video frame or scene) that can be used in a post-processing stage to reconstruct the HDR signal from a decoded SDR signal.

When the decoded SDR signal and the reconstructed HDR signal do not have the same color space, an inverse gamut mapping (being the dual function of a gamut mapping in a pre-processing stage at the HDR encoding) may be used in such post-processing stage. In practice, color gamuts may be defined by standards such as NTSC, ITU-R BT rec.709 ("rec. 709"), ITU-R BT rec. 2020 ("rec. 2020"), Adobe RGB, DCI-P3, or any other present or future standards for color reproduction or any other constraint(s) on color variety. In case of single layer distribution of HDR/WCG, "color gamut mapping" is the process of mapping or redistributing colors of the wider color gamut ("source colors") to colors of a narrower color gamut ("target colors") However, existing color gamut mapping methods are problematic because they result in a deterioration of the consistency of colors (e.g., a deformation of the neighborhood of a color in the resulting target color gamut) after color gamut mapping. Such problems arise from the existing methods' compression or expansion of saturation and/or of hue and/or of lightness of colors in relation to the boundaries of the source and the target color gamuts. In color gamut mapping and notably in boundary color gamut mapping, non-uniform saturation modifications may occur when there is significant mismatch between primary colors defining the source color gamut and primary colors defining the target color gamut (e.g., misaligned gamut boundaries). Thus, the modification of saturation induced by color gamut mapping can be quite different for similar hues (for example for hue angle 75° the saturation might be divided by a factor of 1.6 and while for hue angle 85° the saturation might be divided by a factor 1.2). This results in the problem of a degradation of the consistency of mapped colors in a color neighborhood.

Additional problems occur when a singular point (e.g. a primary or secondary color) in the gamut boundary of the source color gamut and the corresponding singular point in the gamut boundary of the target color gamut have different hues. Indeed when mapping colors from a wide color gamut to a narrower one, saturation needs to be compressed, otherwise the colors are clipped to the narrower color gamut, leading to visual artifacts (e.g. details loss). However, clipping is not revertible and induces details loss, which cannot be reverted by the inverse gamut mapping during HDR-rendering. An alternative to such clipping is to compress saturation meaning that the color is moved in direction of the gray axis along a 'constant hue' line to alter hue as little as possible ('constant hue' is specific to the working color space). However, in XYZ and even in so called perceptual color spaces such as CIE L*a*b* or IPT, perceived hues are not fully aligned on hue lines (perceived hue versus hue line of the color space). Thus saturation compression leads to perceived hue shift. For example in L*a*b* color space, a pure rec.2020 red mapped into rec.709 appears orange. Besides, shifting the hue lines such that the perceived hue of the most saturated colors (i.e. on the cusp) is preserved would lead to a hue shift for less saturated colors.

An invertible gamut mapping method that preserves a perceived hue is therefore desirable for enhancing the rendering of HDR signal.

3. SUMMARY

The following presents a simplified summary of the present principles in order to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles set out to remedy at least one of the drawbacks of the prior art with a method for invertible color gamut mapping of an image comprising a preservation area that keeps the hue unchanged for less saturated colors, and a geometric hue mapping relying on the preservation area and on a hue color correction required per primary and/or secondary colors for colors with higher saturation.

According to a first aspect a method for invertible color gamut mapping of an image is disclosed that comprises for each key color of at least 3 key colors, obtaining a preserved key color and a hue alignment angle of the key color; and performing a hue mapping of the current color from the first color gamut towards the second color gamut wherein:
  in case the current color is in a preserved area defined by the preserved key color, the hue mapped current color is the current color, and
  in case the current color is out of the preserved area, the hue mapped current color is calculated from the hue alignment angle of two adjacent key colors of the current color and from the preserved area.

According to a specific characteristic, a current color is defined by an angle representative of a hue and by an absolute value representative of a saturation in a chroma plane.

According to another specific characteristic, performing hue mapping of the current color further comprises:
  determining 2 adjacent key colors among the at least 3 key colors of the current color;
  for each adjacent key color, determining a rotated key color by projecting the key color on a rotated hue line being a hue line through the key color rotated by the hue alignment angle;
  for each adjacent key color, determining a forward key hue line being a line through the key color and the preserved key color;
  for each adjacent key color, determining a backward key hue line being a line through the rotated key color and the preserved key color;
  determining a forward anchor at the intersection between the forward key hue line of the 2 adjacent key colors;
  determining a backward anchor at the intersection between the backward key hue line of the 2 adjacent key colors;
  determining a preserved current color at the intersection of a forward hue line defined between the current color and the forward anchor and a preservation line defined between preserved key color of the 2 adjacent key colors; and
  determining the hue mapped current color wherein
    in case the saturation of the current color is below the saturation of preserved current color, then the hue mapped current color is the current color;
    else the hue mapped current color is obtained by projecting the current color on a backward hue line defined by the preserved color and the backward anchor.

According to different variants of another specific characteristic, the preserved key color is located on one of a key hue line defined between an origin of the chroma plane and the key color, a rotated key hue line defined being the key hue line rotated by hue rotation angle, a median key hue line defined being the key hue line rotated by half the hue rotation angle.

According to different variants of another specific characteristic, a key color is selected from a group of primary colors and of secondary colors.

According to different variants of another specific characteristic, the projecting key color is one of an oblique projection, an orthogonal projection, a rotation around the origin of the chroma plane, a rotation around the preserved key color.

According to another specific characteristic, obtaining a preserved key color and a hue alignment angle of the key color comprises receiving metadata relative to parameters used for invertible color gamut mapping.

According to a second aspect, a device for gamut mapping from a first color gamut towards a second color gamut is disclosed. The device comprises a processor configured to obtain a preserved key color and a hue alignment angle for each key color of at least 3 key colors; and to perform a hue mapping of the current color from the first color gamut towards the second color gamut wherein:
  in case the current color is in a preserved area defined by the preserved key color, the hue mapped current color is the current color, and
  in case the current color is out of the preserved area, the hue mapped current color is calculated from the hue alignment angle of two adjacent key colors of the current color and from the preserved area.

In a variant, the device for color gamut mapping from a first color gamut towards a second color gamut comprises means for obtaining a preserved key color and a hue alignment angle for each key color of at least 3 key colors;

and means for performing a hue mapping of the current color from the first color gamut towards the second color gamut wherein in case the current color is in a preserved area defined by said preserved key color, the hue mapped current color is the current color, and in case the current color is out of said preserved area, the hue mapped current color is calculated from the hue alignment angle of two adjacent key colors of the current color and from the preserved area.

According to a third aspect, a signal having a SDR video and parameter values used for invertible color gamut mapping is disclosed. The signal is further formatted to comprise HueAdjmode, HueGlobalPreservationRatio, huePreservation ratio[c], hueAlignCorrectionPresentflag and hueAlignCorrection[c].

According to a fourth aspect, a non-transitory processor-readable medium whose contents store a SDR video and metadata relative to parameters used for invertible color gamut mapping, the non-transitory processor-readable medium further comprises HueAdjmode, HueGlobalPreservationRatio, huePreservation ratio[c], hueAlignCorrectionPresentflag and hueAlignCorrection[c].

According to a fifth aspect, a computer program product comprising program code instructions to execute the steps of the disclosed method when this program is executed on a computer is disclosed.

According to a sixth aspect, a processor readable medium is disclosed that has stored therein instructions for causing a processor to perform at least the steps of the disclosed method.

According to a seventh aspect, a non-transitory program storage device is disclosed that is readable by a computer, tangibly embodies a program of instructions executable by the computer to perform the disclosed method.

While not explicitly described, the present embodiments may be employed in any combination or sub-combination. Besides, any characteristic or embodiment described for the method is compatible with a device intended to process the disclosed method and with a computer-readable storage medium storing program instructions.

4. BRIEF DESCRIPTION OF DRAWINGS

In the drawings, examples of the present principles are illustrated. It shows:

Similar or same elements are referenced with the same reference numbers.

5. DESCRIPTION OF EXAMPLE OF THE PRESENT PRINCIPLES

Figure 1:
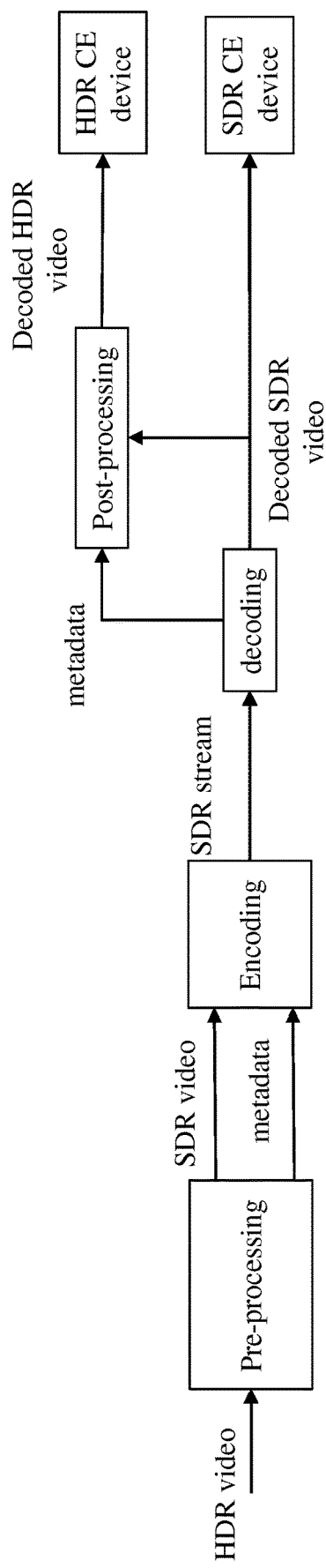
FIG. 1 shows an end-to-end workflow supporting content production and delivery to HDR and SDR displays.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase "in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims.

While not explicitly described, the present examples and variants may be employed in any combination or sub-combination.

The present principles are described for decoding an image but extends to the decoding of a sequence of images (video) because each image of the sequence is sequentially encoded/decoded as described below.

FIG. 1 shows an end-to-end workflow supporting content production and delivery to HDR and SDR displays. It involves a single-layer SDR/HDR encoding-decoding with side metadata as defined, for example, in the ETSI recommendation ETSI TS 103 433. The reader may also refer to the IBC 2016 article ("A single-Layer HDR video coding framework with SDR compatibility", E. Francois and L. Van de Kerkhof, IBC 2016) for more details.

At a pre-processing stage, an incoming HDR video is decomposed in an SDR video and metadata. The SDR video is then encoded with any SDR video codec and an SDR bitstream is carried throughout an existing SDR distribution network with accompanying metadata conveyed on a specific channel or embedded in the SDR bitstream.

Preferably, the video coded is an HEVC codec such as the H.265/HEVC codec or H.264/AVC.

The metadata are typically carried by SEI messages when used in conjunction with an H.265/HEVC or H.264/AVC codec.

The SDR bitstream is decoded and a decoded SDR video is then available for an SDR Consumer Electronics (CE) display.

Next, at a post-processing stage, which is functionally the inverse of the pre-processing stage, the HDR video is reconstructed from the decoded SDR video and metadata obtained from a specific channel or from the SDR bitstream.

Figure 2A:
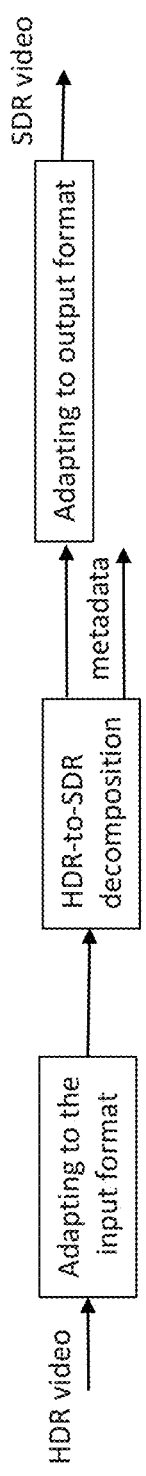
FIG. 2a depicts in more details the pre-processing stage.

FIG. 2a depicts in more details the pre-processing stage.

The core component of the pre-processing stage is the HDR-to-SDR decomposition that generates an SDR video and dynamic metadata from the HDR video.

More precisely, the HDR-to-SDR decomposition aims at converting a HDR video represented in a specific input format to a SDR video represented in a specific output format according to the embodiment disclosed below but the present principles are not limited to specific input/output format (color space or gamut).

Optionally, the format of the HDR video, respectively the format of the SDR video, may be adapted to said specific input format, respectively specific output format.

Said input/output format adapting may include color space conversion and/or color gamut mapping. Usual format adapting processes may be used such as RGB-to-YUV or YUV-to-RGB conversion, BT.709-to-BT.2020 or BT.2020-to-BT.709, down-sampling or up-sampling chroma components, etc.

The HDR-to-SDR decomposition aims at converting an input linear-light 4:4:4 RGB HDR video to an SDR compatible version. The process uses static metadata such as the color primaries and gamut of the container of the HDR and SDR images.

Optionally, the format of the HDR video may be previously adapted to the pre-determined input format of the pre-processing stage and/or a gamut mapping may be used when the HDR video (input of the HDR decomposition stage) and SDR video (output of the HDR decomposition stage) are represented in different color spaces.

Figure 2B:
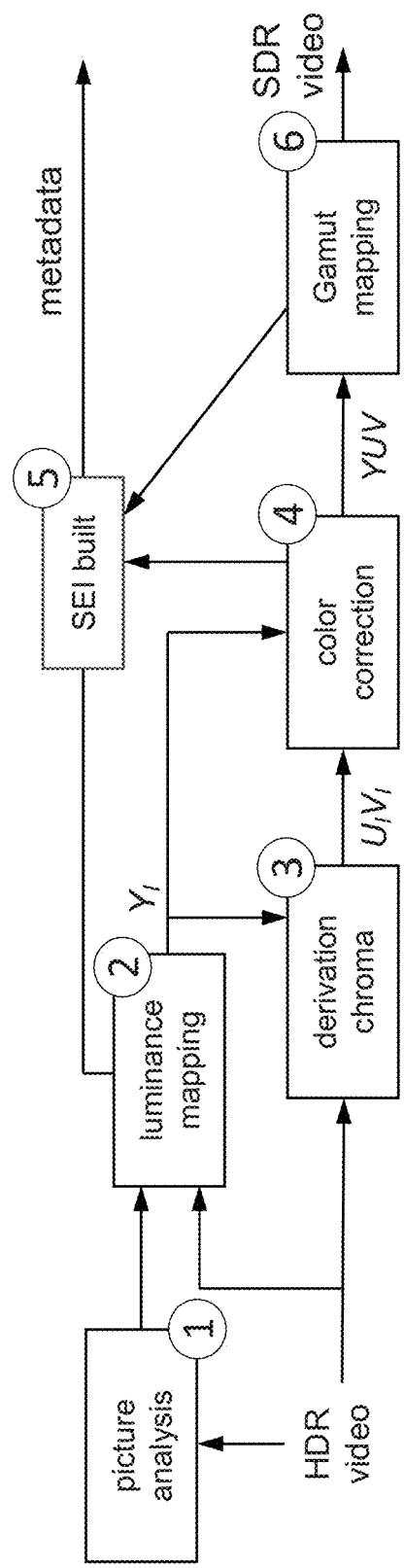
FIG. 2b depicts the HDR-to-SDR decomposition in more details.

FIG. 2b depicts the HDR-to-SDR decomposition in more details.

In the following, the HDR video samples are represented in the RGB color space (specific input format) and the SDR video samples are represented in the RGB color space (specific output format).

In step 1, the HDR video is analyzed image per image in order to derive a set of mapping parameters that will be further used to convert the HDR video into SDR video.

In step 2, the luminance component L of a current image of the HDR video to be decomposed, is luminance mapped to an SDR luma component $Y_l$. The resulting signal is the SDR luma (the SDR luma component $Y_l$) given by:

$$L = A_1 \begin{bmatrix} R \\ G \\ B \end{bmatrix} \quad (1)$$

$$Y_l = TM[L] \quad (2)$$

where $A=[A_1 A_2 A_3]^T$ is the canonical 3×3 R'G'B'-to-Y'CbCr conversion matrix (e.g. as specified in ITU-R Rec. BT.2020 or ITU-R Rec. BT.709 depending on the color space), $A_1 A_2 A_3$ being 1×3 matrices and where the luminance mapping is based on a perceptual transfer function TM (e.g. also specified in ITU-R Rec. BT.2020 or ITU-R Rec. BT.709 depending on the color space).

In step 3 in FIG. 2b, the chroma components are derived as follows. First the R, G, B values of the input HDR video are scaled by the ratio ($Y_l$/L), which results in a linear-light SDR version of RGB. Then a square-root is applied, to reproduce a transfer function close to the ITU-R Rec. BT.709 OETF (Opto-Electrical Transfer Function). Note that the usage of a square root guarantees the reversibility of the process.

The resulting R, G, B signal is converted to chroma components $U_l$, $V_l$:

$$\begin{bmatrix} U_l \\ V_l \end{bmatrix} = \sqrt{\frac{Y_l}{L}} * \begin{bmatrix} A_2 \\ A_3 \end{bmatrix} * \begin{bmatrix} \sqrt{R} \\ \sqrt{G} \\ \sqrt{B} \end{bmatrix} \quad (3)$$

In step 4, a final color correction is applied in order to match the SDR colors to the HDR video colors. First the chroma components are adjusted by a scaling factor $1/\beta(Y_l)$, where $\beta(Y_l)$ is a function that enables control of the color saturation and hue of the resulting SDR video.

$$\begin{bmatrix} U_{SDR} \\ V_{SDR} \end{bmatrix} = \frac{1}{\beta(Y_l)} * \begin{bmatrix} U_l \\ V_l \end{bmatrix} \quad (4)$$

This step allows control of the SDR colors and to guarantee their matching to the HDR colors.

In step 6, an invertible gamut mapping process could apply when the input SDR picture of the SDR-to-HDR reconstruction process is provided in a BT.709 color gamut (as specified by the variable prePicColourSpace), and is different from the target BT.2020 color gamut of the HDR picture (as specified by the variable recPicColourSpace). Color backward compatibility is defined such that the SDR CE receiver only supports BT.709 color space while the video to be distributed using SL-HDR1 can support BT.2020 color space. When recPicColourSpace is not equal to prePicColourSpace, at the HDR-to-SDR decomposition side the WCG HDR video shall be converted to a standard color gamut SDR video (plus metadata) while the inverse process at the HDR reconstruction side reverts this conversion by rendering the WCG HDR video from the standard color gamut SDR video (plus metadata). The cascading of those two color processes should be visually lossless, while the standard color gamut SDR video should entirely preserve the artistic intent of the original WCG HDR video with minimal impairments. Both color reconstruction (inverse gamut mapping) and compression (gamut mapping) conversions are specified to be reciprocal.

In step 5, metadata relative to the luminance mapping (step 2), color correction (step 4) and invertible gamut mapping (step 6) are conveyed to the post-processing stage. The metadata are conveyed as static metadata (in case parameters do not change with the picture) or dynamic metadata (in case parameters change with the picture as for luminance mapping).

These metadata enable fine control of the texture and colors of the SDR version, and to ensure a good fitting to the HDR intent.

Figure 3A:
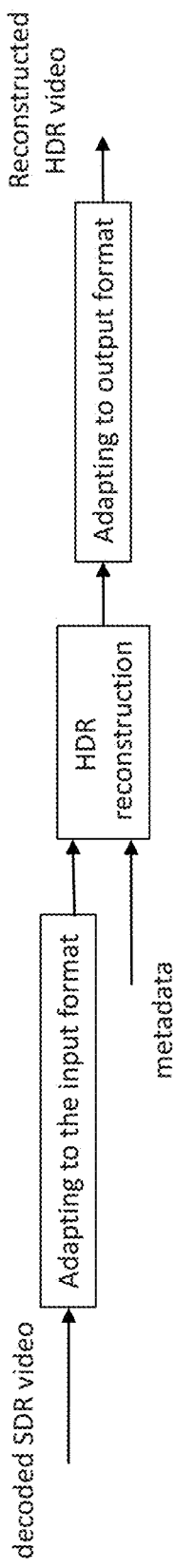
FIG. 3a depicts in more details the post-processing stage.

FIG. 3a depicts in more details the post-processing stage.

The core component of the post-processing stage is the SDR-to-HDR reconstruction that reconstructs an HDR video from a (decoded) SDR video and metadata.

More precisely, the HDR reconstruction aims at converting SDR video represented in a specific input format to an output HDR video represented in a specific output format according to the embodiment disclosed below but the present principles are not limited to specific input/output specific formats (color space or gamut).

Said input or output format adapting may include color space conversion and/or color gamut mapping. Usual format adapting processes may be used such as RGB-to-YUV or YUV-to-RGB conversion, BT.709-to-BT.2020 or BT.2020-to-BT.709 etc. For example, see Annex D of the ETSI recommendation ETSI TS 103 433 provides use cases of inverse gamut mapping.

Optionally, the format of the reconstructed HDR video may be adapted to a targeted system characteristics (e.g. a Set-Top-Box, a connected TV) and/or an inverse gamut mapping may be used when the decoded SDR video (input of the HDR reconstruction stage) and the reconstructed HDR video (output of the HDR reconstruction stage) are represented in different color spaces and/or gamut.

Figure 3B:
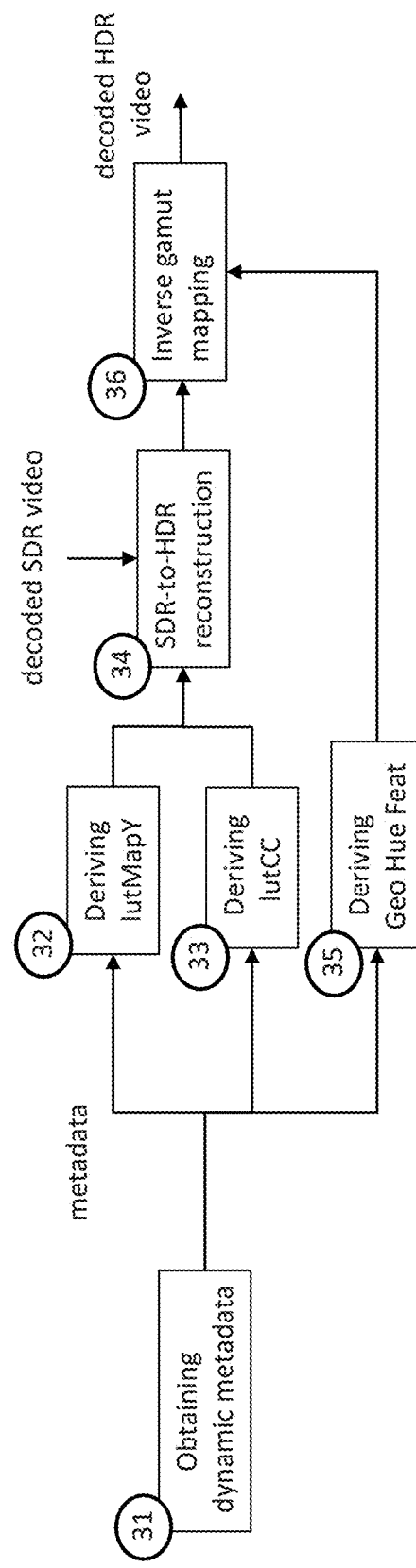
FIG. 3b depicts in more details the HDR reconstruction process.

FIG. 3b depicts in more details the HDR reconstruction process.

The HDR reconstruction is the functional inverse of the HDR-to-SDR decomposition (FIG. 2b). However, for implementation complexity reasons, some operations are concatenated or applied in a different order.

In step 31, dynamic and/or static metadata are obtained, for example from the SDR bitstream or from a specific channel.

In step 32, a luminance-mapping look-up-table lutMapY (a 1D look-up table) is derived from the obtained metadata. This luminance-mapping look-up-table corresponds to the inverse of the square-root of the luminance mapping curve.

In step 33, a color-correction look-up-table lutCC is derived from the obtained dynamic metadata. The color-correction look-up-table lutCC is linked to the pre-processing color correction $\beta_p(Y_l)$ (equation 4) and the luminance-mapping look-up table lutMapY by the following equation:

$$\beta[Y] = 2^B \times \text{lutMapY}[Y] \times \text{lutCC}[Y] \quad (5)$$

where B is the bit-depth of the luma component of the decoded SDR image.

In step 34, an image of the reconstructed HDR video (linear-light HDR video) is reconstructed by applying a HDR reconstruction to an image of the decoded SDR video using the derived luma-related look-up table lutMapY and the derived color correction look-up table lutCC. In step 36, the color reconstruction or inverse gamut mapping process enables the generation of a wide color gamut picture from a standard color gamut picture with associated metadata. This process is defined for a 4:4:4 chroma sampling and full range YUV linear-light signal. The input YUV signal comes from the conversion of an input RGB linear-light signal (output of the SDR-to-HDR reconstruction process 34) to a YUV color space thanks to the canonical R'G'B'-to-Y'CbCr matrix (computed thanks to SMPTE RP 177 [i.8]). This process further comprises a chroma remapping, a lightness remapping and a hue remapping according to the described embodiments.

The post-processing operates on a luminance-mapping look-up table lutMapY (step 32), a color correction look-up table lutCC (step 33), and inverse gamut mapping parameters (step 35) defining a preservation area that keeps the hue unchanged for less saturated colors, and the amount of color correction required per primary and secondary color for the other colors. The respective table and parameters are derived from metadata (step 31).

Said metadata may be conveyed (step 5) according to either a so-called parameter-based mode or a table-based mode in order to derive the luminance-mapping look-up-table lutMapY (step 32), the color-correction look-up-table lutCC (step 33) and the inverse gamut mapping (step 35) from obtained metadata (step 31).

Some metadata to be conveyed in step 5 are hue mapping parameters representative of a preservation area that keeps the hue unchanged for less saturated colors, and of a hue color correction required per primary and/or secondary colors for colors with higher saturation (ETSI recommendation ETSI TS 103 433 clause 6.3.10). Accordingly the following parameters are described: hueAdjMode, hueGlobalPreservationRatio, huePreservationRatio, hueAlignCorrectionPresentFlag, hueAlignCorrection.

hueAdjMode

This variable indicates the mode of hue adjustment used by the invertible gamut mapping. The value of hueAdjMode shall be as defined in the following table:

| Value of hueAdjMode | Definition |
| --- | --- |
| 0 | Hue adjustment disabled |
| 1 | Global linear hue adjustment method |
| 2 | Piece-wise hue adjustment with globally preserved area |
| 3 | Piece-wise hue adjustment with preservation of areas per primary and secondary colours | hueGlobalPreservationRatio

This variable indicates the global preservation percentage for the hue adjustment. This variable shall be invoked only when hueAdjMode is equal to 2. The value of hueGlobalPreservationRatio shall be in the bounded range [0 to 0.875] and in multiples of (1÷8).

huePreservationRatio

This array of six variables indicates the preservation ratio to be applied to each primary or secondary colors during the hue adjustment process. This array shall be invoked only when hueAdjMode is equal to 3. The index value c equal to 0 should correspond to the red primary, c equal to 1 should correspond to the magenta secondary, c equal to 2 should correspond to the blue primary, c equal to 3 should correspond to the cyan secondary, c equal to 4 should correspond to the green primary, c equal to 5 should correspond to the yellow secondary. The value of huePreservationRatio[c] shall be in the bounded range [0 to 0.875] and in multiples of (1÷8).

hueAlignCorrectionPresentFlag

This variable indicates the presence of hue alignment correction parameters for each primary and secondary colors. A value of hueAlignCorrectionPresentFlag equal to 0 indicates that the parameters are not present. A value of hueAlignCorrectionPresentFlag equal to 1 indicates that the parameters are present.

hueAlignCorrection

This array of five variables indicates the hue correction angle associated to each primary or secondary color during the hue adjustment process. This array shall be invoked when hueAlignCorrectionPresentFlag is equal to 1 and when hueAdjMode is not equal to 0. The index value c equal to 0 should correspond to the red primary, c equal to 1 should correspond to the magenta secondary, c equal to 2 should correspond to the blue primary, c equal to 3 should correspond to the cyan secondary, c equal to 4 should correspond to the green primary, c equal to 5 should correspond to the yellow secondary. The value of hueAlignCorrection[c] shall be in the bounded range [0 to 0.875] and in multiples of (1÷8).

These dynamic metadata may be conveyed using the HEVC Colour Volume Reconstruction Information (CVRI) user data registered SEI message whose syntax is based on the SMPTE ST 2094-20 specification (ETSI recommendation ETSI TS 103 433 Annex A.3).

In step 31, the CVRI SEI message is thus parsed to obtain the luminance mapping parameters, the color correction parameters and the inverse gamut parameters.

In step 32, the luminance-mapping look-up-table lutMapY is reconstructed (derived) from the obtained luminance mapping parameters (see ETSI TS 103 433 clause 7.2.3.1 for more details).

In step 33, the color-correction look-up-table lutCC is reconstructed (derived) from the obtained color correction parameters (see ETSI TS 103 433 clause 7.2.3.2 for more details).

In step 35, the geometric features (namely the rotated gamut and the preserved gamut) for the inverse hue mapping are determined (derived) from the obtained inverse gamut mapping parameters as described hereafter with the gamut mapping method.

These metadata may be conveyed as dynamic metadata using the HEVC Colour Remapping Information (CRI) SEI message whose syntax is based on the SMPTE ST 2094-30 specification (ETSI recommendation ETSI TS 103 433 Annex A.4).

Note that static metadata may also be used by the post-processing stage and conveyed by SEI message. For example, the selection of the hue mapping method may be carried by the TS 103 433 Information (TSI) user data registered SEI message (payloadMode) as defined by ETSI TS 103 433 (clause A.2.2). Static metadata such as, for example, the color primaries or the maximum display mastering display luminance are conveyed by a Mastering Display Colour Volume (MDCV) SEI message as defined in AVC, HEVC.

Figure 4A:
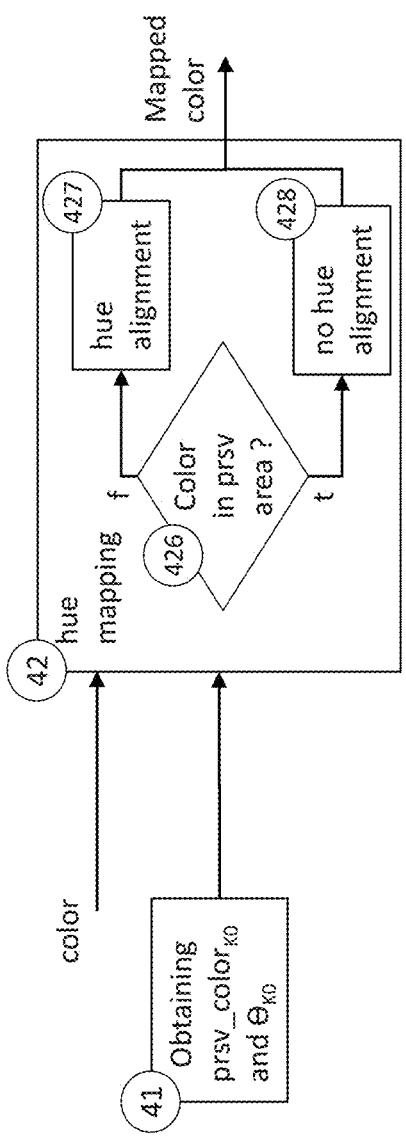
FIG. 4a shows a block diagram of the steps of a method for invertible gamut mapping in accordance with examples of the present principles.
Figure 5A:
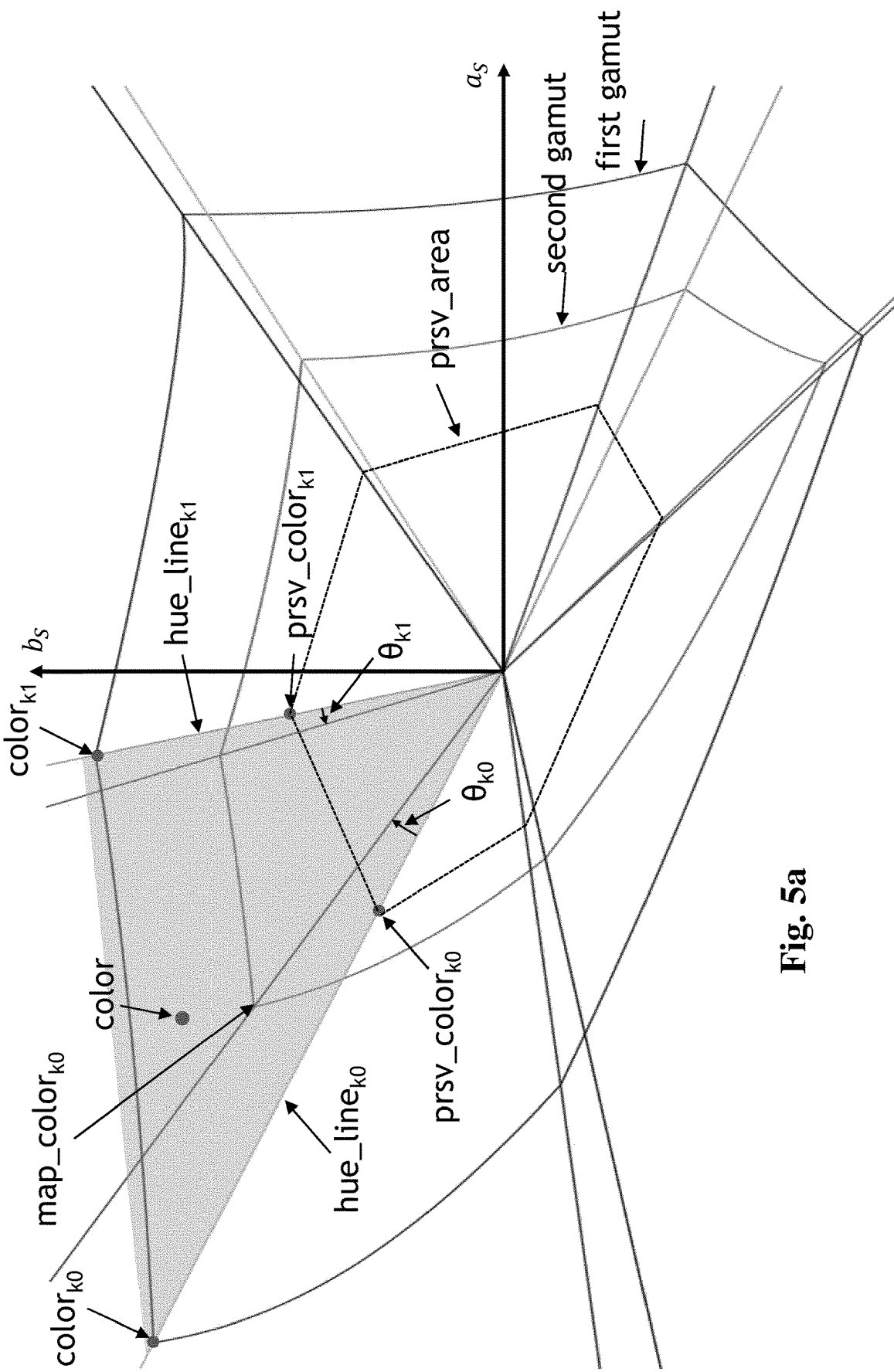
FIG. 5a illustrates the geometric hue mapping in a chroma plane in accordance with examples of the present principles.

FIG. 4a shows a block diagram of the steps of a method for invertible gamut mapping in accordance with examples of the present principles. This method is compatible on any HDR-to-SDR decomposition process producing a SDR image and metadata. For illustrative purpose, the gamut mapping method is part (step 6) of the HDR-to-SDR decomposition process as described in relation with FIG. 2b. This process is particularly adapted when the wide color gamut HDR video shall be converted to a standard color gamut SDR video. However, since this method is fully invertible, the method is also compatible with any SDR-to-HDR reconstruction process producing a HDR image. For illustrative purpose, the gamut mapping method is also part (step 36) of the SDR-to-HDR reconstruction process as described in relation with FIG. 3b. This process is particularly adapted when the standard color gamut SDR video shall be converted back to a wide color gamut HDR video. However the method is also compatible with any process involving backward and/or forward gamut mapping from a first color gamut towards a second color gamut. The HDR video samples and the SDR video samples can be represented in any color space such as YUV, CIELUV, L*a*b* or IPT. For illustrative purpose, a HDR video sample, called color, is represented by an angle representative of a hue and by an absolute value representative of a saturation in polar coordinates of a chroma plane having a constant lightness of a L*a*b* color space as shown on FIG. 5a.

Figure 5B:
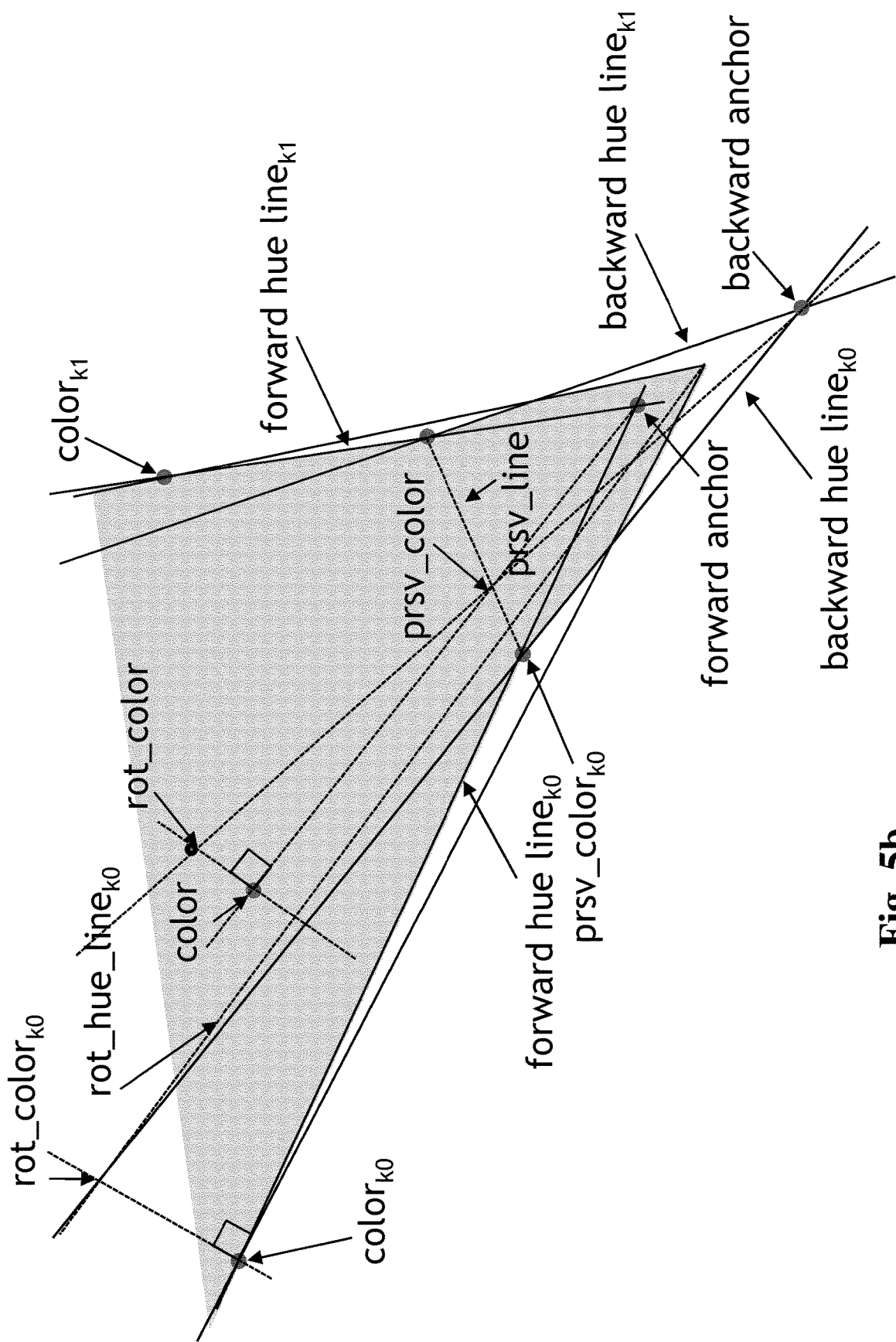
FIG. 5b illustrates the geometric hue mapping in a chroma plane in accordance with examples of the present principles.

In a preliminary step 41, a preserved key color (prsv_color$_{K0}$, prsv_color$_{K1}$) and a hue alignment correction angle (θK$_0$, θ$_{K1}$) for the key color (color$_{K0}$, color$_{K1}$) are obtained. A key color (color$_{K0}$, color$_{K1}$) is selected from a group of primary colors and of secondary colors. A key color (color$_{K0}$, color$_{K1}$) belongs to the boundary of first gamut. A corresponding mapped key color (map_color$_{K0}$) belongs to the boundary of second gamut. The hue alignment correction angle (θK$_0$, θ$_{K1}$) is defined between the hue line (hue_line$_{k0}$, hue_line$_{k1}$) of the key color (color$_{K0}$, color$_{K1}$) and the hue line (rot_hue_line$_{k0}$) of the corresponding mapped key color (map_color$_{K0}$). The hue alignment correction angle (θK$_0$, θ$_{K1}$) is thus representative of the amount of hue correction for a key color between the first and second gamut. For example, the hue alignment correction angle (θK$_0$, θ$_{K1}$) is defined so that the perceived hue of the mapped key color (including other color gamut mapping steps) is the same as the perceived hue of the source key color. At least 3 key colors are defined and up to 6 key colors as represented on FIG. 5a. The preserved key colors (prsv_color$_{K0}$, prsv_col- $or_{K1}$) define a preserved area (prsv_area) or preserved gamut around the lightness axis and correspond to less saturated colors. In specific alternative variants, the preserved key color is on the key hue line (hue_line$_{k0}$) defined between the center (i.e. origin) of the chroma plane and the key color (color$_{K0}$), on the rotated key hue line (rot_hue_line$_{k0}$) defined being the key hue line rotated by hue rotation angle ($\theta_{K0}$), or on a median key hue line defined being the key hue line rotated by half the hue rotation angle ($\theta_{K0}$). Indeed, the preserved key color might be anywhere in the chroma plane, preferably in the section between the key hue line (hue_line$_{k0}$) and on the rotated key hue line (rot_hue_line$_{k0}$) as shown on FIG. 5b. The preserved key color is for instance defined by an angle (between 0 and $\theta_{K0}$) relatively to the key hue line (hue_line$_{k0}$) and a saturation (between 0 and saturation of color$_{K0}$). According to a particular characteristic, colors in the preserved area are not modified, (meaning in that case that the hue is unchanged) and colors not in the preserved area are hue mapped according to the revertible geometric hue mapping as detailed hereafter. In a HDR-to-SDR decomposition process, key colors and corresponding preserved key colors, hue alignment correction angles are defined and coded as parameters for invertible gamut mapping as exposed above. The hue mapping parameters thus define a preservation area (prsv_area) that keeps the hue unchanged for less saturated colors and the amount of color correction required per primary and secondary color for the other colors. The hue mapping parameters used for invertible gamut mapping are then sent as static or dynamic metadata for inverse gamut mapping. In the SDR-to-HDR reconstruction process, metadata relative to parameters used for invertible gamut mapping are received, and key colors and corresponding preserved key colors, hue alignment correction angles are derived from the received parameters.

Figure 5C:
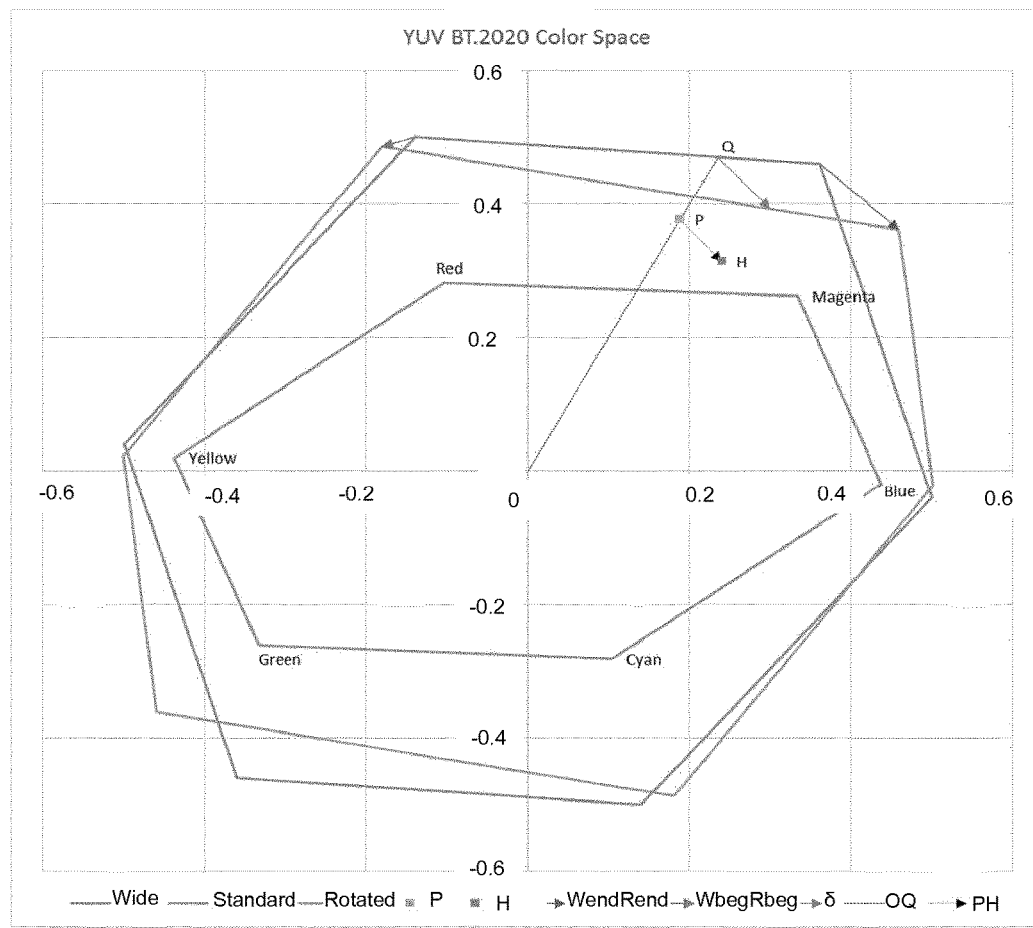
FIG. 5c illustrates the geometric hue mapping without preserved area in a chroma plane of an YUV color space in accordance with examples of the present principles.
Figure 5D:
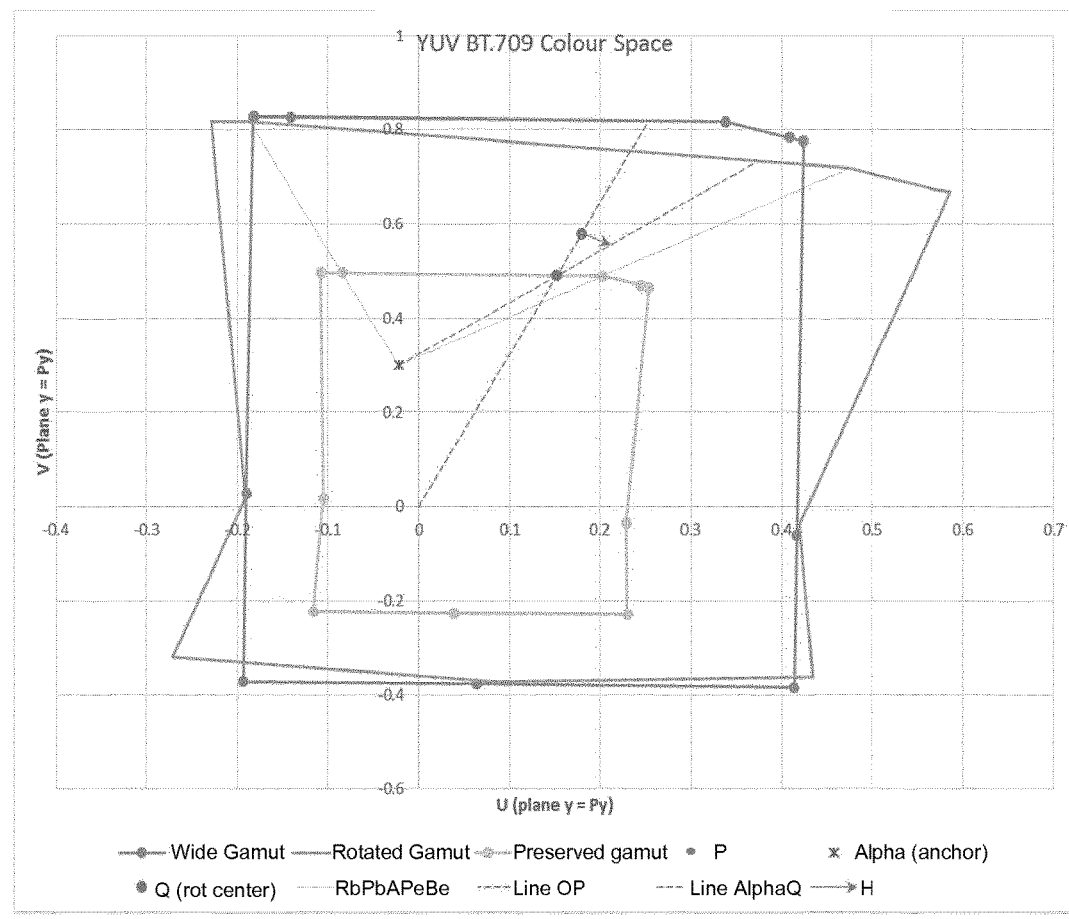
FIG. 5d illustrates the geometric hue mapping with preserved area in a chroma plane of an YUV color space in accordance with examples of the present principles.

In a step 42, a hue mapping of the current color (color) from the first color gamut towards the second color gamut is applied. In a sub-step 426, the condition of the current color belonging to the preserved area is tested. In case the current color (color) belongs to the preserved area (true condition) defined by the preserved key colors (prsv_color$_{K0}$, prsv_color$_{K1}$), the hue mapped current color is the current color, no hue alignment (428) is performed for that the hue of the current color is not changed. In case the current color is out of the preserved area (false condition), the hue mapped current color is calculated from the hue alignment angle ($\theta K_0$, $\theta_{K1}$) of two adjacent key colors of the current color. The hue mapping is called geometric hue mapping as based on geometric construction in the chroma plane. Advantageously, the hue compensation which is applied on the HDR-to-SDR decomposition process is used to improve the perceived hue for some saturated colors. This compensation is reverted in the inverse gamut mapping process in the SDR-to-HDR reconstruction process. The hue compensation keeps the luminance unchanged. This operation is nearly equivalent to a rotation in the chroma plane but with a significant part of the narrow (standard) gamut being preserved (i.e. no remapping). Although, the characteristic of the preserved area is presented as part of the gamut mapping method, the geometric hue mapping can be applied to the whole chroma plane without preserved gamut as illustrates on FIG. 5c. Those skilled in the art will appreciate that, in that case, the preserved color, and thus the latter defined forward and backward anchor, are then located at the origin of the chroma plane.

Figure 4B:
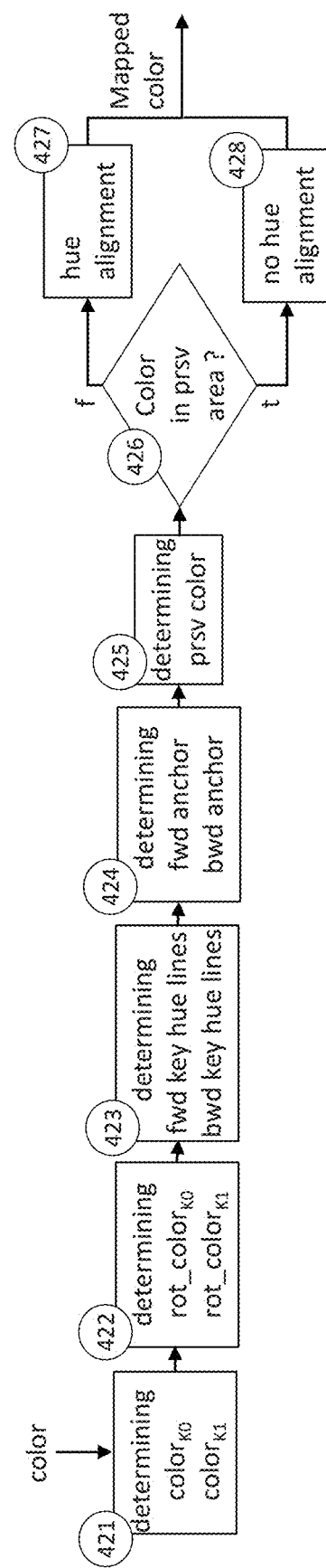
FIG. 4b shows a block diagram of the step of geometric hue mapping in accordance with examples of the present principles.

FIG. 4b shows a block diagram of the step of geometric hue mapping in accordance with examples of the present principles. References for geometric construction are shown on FIG. 5b that illustrate the geometric hue mapping in a chroma plane with polar coordinates. The step 42 of hue mapping of the current color (color) is now described.

In a sub-step 421, 2 adjacent key colors (color$_{K0}$, color$_{K1}$) among the at least 3 key colors are determined for the current color. As shown on FIG. 5a, the chroma plane is divided in sections, each section defined by two key colors. The adjacent key colors are the key colors defining the section to which the current color belongs. In other words, the adjacent key colors or neighboring key colors are the 2 key colors (color$_{K0}$, color$_{K1}$) such that the current color (color) is surrounded by the corresponding key hue lines in the chroma plane. Such adjacent key colors are for instance determined based on the hue angle of the current color compared with hue angle of key colors in the plane. In a variant, cross products are used to determine the position of the current color relative to the forward hue lines (as the sign of the cross vector product allows determining the relative position of a point with respect to a line).

In a sub-step 422, for each adjacent key color (color$_{K0}$), a rotated key color (rot_color$_{K0}$) is determined by projecting the key color (color$_{K0}$) on a rotated hue line (rot_hue_line$_{K0}$) being the hue line of the key color rotated by the hue alignment angle ($\theta_{K0}$) parameter. According to different variants, the projection is one of a rotation around the center of the chroma plane, an oblique projection (as shown on FIG. 5b), an orthogonal projection, a rotation around the preserved key color. In the variant of a hue rotation in the chroma plane (i.e. around the grey axis or origin of the polar coordinates), the rotated key color is defined as the intersection between a circle centered on the grey axis (i.e. lightness axis) passing through the key color (color$_{K0}$) with the rotated key hue line defined by the hue alignment angle ($\theta_{K0}$). This variant corresponds to a real hue rotation and the saturation is not changed by the hue mapping. According to the variant of an oblique projection illustrated on FIG. 5b, the rotated key color (rot_color$_{K0}$) is defined as the intersection of the line perpendicular to the key hue line (hue_line$_{k0}$) passing through the key color (color$_{K0}$) with the rotated key hue line defined by the hue alignment angle ($\theta_{K0}$) (oblique projection of the key color on the rotated key hue line). According to the variant of an orthogonal projection, the rotated key color (rot_color$_{K0}$) is defined as the intersection of the rotated key hue line with the line passing through the key color (color$_{K0}$) and perpendicular to the rotated key hue line (rot_hue_line$_{K0}$) (orthogonal projection of the key color on the rotated key hue line). Yet according to another variant, a local rotation around the preserved key color (prsv_color$_{k0}$) is done. The rotated key color (rot_color$_{K0}$) is defined as the intersection of a circle centered on the preserved key color (prsv_color$_{k0}$) passing through the key color (color$_{K0}$) with the rotated key hue line defined by the hue alignment angle ($\theta_{K0}$) Unlike the variant of the rotation around the center of the chroma plane, those 3 latest variants induce modification of the saturation. However, for small alignment angles these transformations are close to the real hue rotation (i.e. around the grey axis) with low saturation modification.

In a sub-step 423, for each adjacent key color (color$_{K0}$, color$_{K1}$), a forward key hue line (forward hue line$_{k0}$, forward hue line$_{k1}$) being a line through the key color (color$_{K0}$, color$_{K1}$) and preserved key color (prsv_color$_{K0}$, prsv_color$_{K1}$) is determined. Besides, in the sub-step 423, for each adjacent key color (color$_{K0}$, color$_{K1}$), a backward key hue line (backward hue line$_{k0}$, backward hue line$_{k1}$) being a line through the rotated key color ($rot\_color_{K0}$, $rotated\_color_{K1}$) and the preserved key color ($prsv\_color_{K0}$, $prsv\_color_{K0}$) is also determined.

Those 2 adjacent forward key hue lines (forward hue $line_{k0}$, forward hue $line_{k1}$) and backward hue lines (backward hue $line_{k0}$, backward hue $line_{k1}$) determine, in a sub-step 424, a forward anchor and a backward anchor. The forward anchor is defined as the intersection between the forward key hue lines (forward hue $line_{k0}$, forward hue $line_{k1}$) of the 2 adjacent key colors ($color_{K0}$, $color_{K1}$). The backward anchor is defined as the intersection between the backward key hue lines (backward hue $line_{k0}$, backward hue $line_{k1}$) of the 2 adjacent key colors ($color_{K0}$, $color_{K1}$). The skilled in the art will notice that in the variant where the preserved key color ($prsv\_color_{k0}$) is on the key hue line (hue_$line_{k0}$), the forward anchor is the center of the chroma plane; in the variant where the preserved key color ($prsv\_color_{k0}$) is on the rotated key hue line (rot_hue_$line_{k0}$), the backward anchor is the origin of the chroma plane.

In a sub-step 425, a preserved current color (prsrv_color) is defined as the intersection of a forward hue line defined between the current color (color) and the forward anchor and a preservation line (prsv_line) defined between preserved key color ($prsv\_color_{K0}$, $prsv\_color_{K1}$) of said 2 adjacent key colors ($color_{K0}$, $color_{K1}$). This preserved current color (prsrv_color) allows determination of whether the current color is in the preserved area or not. According to different variants, the preservation line defined between the preserved key colors ($prsv\_color_{K0}$, $prsv\_color_{K1}$) is a straight line (as shown on FIG. 5b), or a curved line.

Then in the sub-step 426, the saturation of the current color (color) is compared to the saturation of the preserved current color (prsrv_color). In case (branch true t) the saturation of the current color is below the saturation of the preserved current color (prsrv_color), then the hue mapped current color is the current color. Else the hue mapped current color is obtained by projecting the current color on the backward hue line defined by the preserved color (prsv_color) and the backward anchor. The projection is the same as used in step 422. Those skilled in the art will understand, that for inverse gamut mapping, forward and backward features are inversed. Thus the inverse hue mapped current color is obtained by projecting a current color on a forward hue line defined by the preserved color (prsv_color) and the forward anchor.

This method is based on any HDR reconstruction process requiring a SDR image and dynamic metadata.

For illustrative purpose, the HDR reconstruction process may be the HDR reconstruction process as described in relation with FIG. 3b. In that case, the HDR image is reconstructed from a decoded SDR image. But, the SDR image, used for reconstructing an HDR image may also be stored with compression and obtained without requiring a decoding.

Then, the method obtains, for example by decoding a SDR bitstream, a (decoded) SDR image whose dynamic range of the luminance values is lower than the dynamic range of the luminance values of the HDR image to be reconstructed.

On FIG. 1-4b, the modules are functional units, which may or may not be in relation with distinguishable physical units. For example, these modules or some of them may be brought together in a unique component or circuit, or contribute to functionalities of a software. A contrario, some modules may potentially be composed of separate physical entities. The apparatus which are compatible with the present principles are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 6:
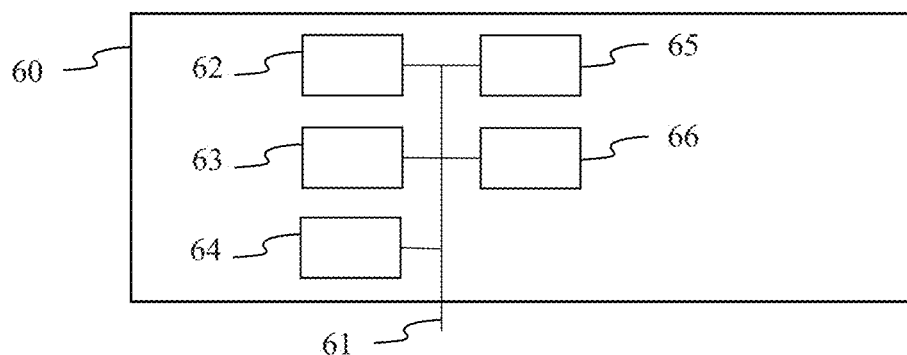
FIG. 6 shows an example of an architecture of a device in accordance with an example of present principles.

FIG. 6 represents an exemplary architecture of a device 60 which may be configured to implement a method described in relation with FIG. 1-4b.

Device 60 comprises following elements that are linked together by a data and address bus 61:
- a microprocessor 62 (or CPU), which is, for example, a DSP (or Digital Signal Processor);
- a ROM (or Read Only Memory) 63;
- a RAM (or Random Access Memory) 64;
- an I/O interface 65 for reception of data to transmit, from an application; and
- a battery 66

In accordance with an example, the battery 66 is external to the device. In each of mentioned memory, the word «register» used in the specification can correspond to area of small capacity (some bits) or to very large area (e.g. a whole program or large amount of received or decoded data). The ROM 63 comprises at least a program and parameters. The ROM 63 may store algorithms and instructions to perform techniques in accordance with described embodiments. When switched on, the CPU 62 uploads the program in the RAM and executes the corresponding instructions.

RAM 64 comprises, in a register, the program executed by the CPU 62 and uploaded after switch on of the device 60, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder, the HDR video or an HDR image of a HDR video is obtained from a source. For example, the source belongs to a set comprising:
- a local memory (63 or 64), e.g. a video memory or a RAM (or Random Access Memory), a flash memory, a ROM (or Read Only Memory), a hard disk;
- a storage interface (65), e.g. an interface with a mass storage, a RAM, a flash memory, a ROM, an optical disc or a magnetic support;
- a communication interface (65), e.g. a wireline interface (for example a bus interface, a wide area network interface, a local area network interface) or a wireless interface (such as a IEEE 802.11 interface or a Bluetooth® interface); and an image capturing circuit (e.g. a sensor such as, for example, a CCD (or Charge-Coupled Device) or CMOS (or Complementary Metal-Oxide-Semiconductor)).

In accordance with an example of the decoding or a decoder, the decoded SRD video or reconstructed HDR video is sent to a destination; specifically, the destination belongs to a set comprising:
- a local memory (63 or 64), e.g. a video memory or a RAM, a flash memory, a hard disk;
- a storage interface (65), e.g. an interface with a mass storage, a RAM, a flash memory, a ROM, an optical disc or a magnetic support;
- a communication interface (65), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface); and
- a display.

In accordance with examples of encoding or encoder, the SDR bitstream and/or the other bitstream carrying the metadata are sent to a destination. As an example, one of these bitstream or both are stored in a local or remote memory, e.g. a video memory (64) or a RAM (64), a hard disk (63). In a variant, one or both of these bitstreams are sent to a storage interface (65), e.g. an interface with a mass storage, a flash memory, ROM, an optical disc or a magnetic support and/or transmitted over a communication interface (65), e.g. an interface to a point to point link, a communication bus, a point to multipoint link or a broadcast network.

In accordance with examples of decoding or decoder, the SDR bitstream and/or the other bitstream carrying the metadata is obtained from a source. Exemplarily, the bitstream is read from a local memory, e.g. a video memory (64), a RAM (64), a ROM (63), a flash memory (63) or a hard disk (63). In a variant, the bitstream is received from a storage interface (65), e.g. an interface with a mass storage, a RAM, a ROM, a flash memory, an optical disc or a magnetic support and/or received from a communication interface (65), e.g. an interface to a point to point link, a bus, a point to multipoint link or a broadcast network.

In accordance with examples, device 60 being configured to implement an encoding method as described above, belongs to a set comprising:
- a mobile device;
- a communication device;
- a game device;
- a tablet (or tablet computer);
- a laptop;
- a still image camera;
- a video camera;
- an encoding chip;
- a still image server; and
- a video server (e.g. a broadcast server, a video-on-demand server or a web server).

In accordance with examples, device 60 being configured to implement a decoding method as described above, belongs to a set comprising:
- a mobile device;
- a communication device;
- a game device;
- a set top box;
- a TV set;
- a tablet (or tablet computer);
- a laptop;
- a display and
- a decoding chip.

Figure 7:
FIG. 7 shows two remote devices communicating over a communication network in accordance with an example of present principles.

According to an example of the present principles, illustrated in FIG. 7, in a transmission context between two remote devices A and B over a communication network NET, the device A comprises a processor in relation with memory RAM and ROM which are configured to implement a method for encoding an image as described above and the device B comprises a processor in relation with memory RAM and ROM which are configured to implement a method for decoding as described above.

In accordance with an example, the network is a broadcast network, adapted to broadcast still images or video images from device A to decoding devices including the device B.

A signal, intended to be transmitted by the device A, carries the SDR bitstream and/or the other bitstream carrying the metadata. The SDR bitstream comprises an encoded SDR video as explained before. This signal further comprises metadata relative to parameter values used for reconstructing an HDR video from said decoded SDR video.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing an image or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present principles, or to carry as data the actual syntax-values written by a described example of the present principles. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising gamut mapping from a first color gamut towards a second color gamut, wherein the first color gamut and the second gamut belong to a color space where a current color comprises a luminance value and two chroma values, the two chroma values comprising an angle representative of a hue and an absolute value representative of a saturation in a chroma plane, the gamut mapping comprising:
for each key color of at least three key colors, obtaining a preserved key color and one hue alignment angle for the key color, the hue alignment angle corresponding to the angle formed between the key color mapped into the second color gamut and key color in the first color gamut with respect to an origin in the chroma plane; and
performing a hue mapping of the current color from the first color gamut towards the second color gamut comprising:
determining two adjacent key colors among the at least three key colors of the current color;
for each adjacent key color, determining a rotated key color by projecting the key color on a rotated hue line being a hue line through the key color rotated by the hue alignment angle from the origin in the chroma plane;
for each adjacent key color, determining a forward key hue line being a line through the key color and the preserved key color;
for each adjacent key color, determining a backward key hue line being a line through the rotated key color and the preserved key color;
determining a forward anchor at an intersection between the forward key hue line of the two adjacent key colors;
determining a backward anchor at an intersection between the backward key hue line of the two adjacent key colors;
determining a preserved current color at an intersection of a forward hue line between the current color and the forward anchor and a preservation line between the preserved key color of the two adjacent key colors; and
determining the hue mapped current color, wherein:
when a saturation of the current color is below a saturation of the preserved current color, the hue mapped current color is the current color; and
when the saturation of the current color is other than below the saturation of the preserved current color, the hue mapped current color is obtained by projecting the current color on a backward hue line defined by the preserved current color and the backward anchor.

2. The method of claim 1, wherein the preserved key color is located on one of: a key hue line between the origin in the chroma plane and the key color, a rotated key hue line being the key hue line rotated by hue rotation angle, a median key hue line being the key hue line rotated by half the hue rotation angle.

3. The method of claim 1, wherein the key color is selected from a group of primary colors and a group of secondary colors.

4. The method of claim 1, wherein projecting the key color is one of: an oblique projection, an orthogonal projection, a rotation around the origin in the chroma plane, a rotation around the preserved key color.

5. The method of claim 1, wherein obtaining a preserved key color and a hue alignment angle of the key color comprises receiving metadata relative to parameters used for invertible gamut mapping.

6. The method according to claim 1, wherein the color space is linear light YUV color space.

7. A device comprising one or more processors and at least one memory having stored instructions operative, when executed by the one or more processors, to cause the device to perform gamut mapping from a first color gamut towards a second color gamut, wherein the first color gamut and the second gamut belong to a color space where a current color comprises a luminance value and two chroma values, the chroma values comprising an angle representative of a hue and an absolute value representative of a saturation in a chroma plane, wherein the instructions further cause the device to:
obtain a preserved key color and one hue alignment angle for each key color of at least three key colors, the hue alignment angle corresponding to the angle formed between the key color mapped into the second color gamut and key color in the first color gamut with respect to an origin in the chroma plane; and
perform a hue mapping of the current color from the first color gamut towards the second color gamut comprising:
determining two adjacent key colors among the at least three key colors of the current color;
for each adjacent key color, determining a rotated key color by projecting the key color on a rotated hue line being a hue line through the key color rotated by the hue alignment angle from the origin in the chroma plane;

for each adjacent key color, determining a forward key hue line being a line through the key color and preserved key color;

for each adjacent key color, determining a backward key hue line being a line through the rotated key color and preserved key color;

determining a forward anchor at the intersection between the forward key hue line of the two adjacent key colors;

determining a backward anchor at an intersection between the backward key hue line of the two adjacent key colors;

determining a preserved current color at an intersection of a forward hue line between the current color and the forward anchor and a preservation line between the preserved key color of the two adjacent key colors; and determine the hue mapped current color, wherein:
when a saturation of the current color is below a saturation of the preserved current color, the hue mapped current color is the current color; and when the saturation of the current color is other than below the saturation of the preserved current color, the hue mapped current color is obtained by projecting the current color on a backward hue line defined by the preserved current color and the backward anchor.

8. The device according to claim 7, wherein the preserved key color is located on one of: a key hue line between the origin in the chroma plane and the key color, a rotated key hue line being the key hue line rotated by hue rotation angle, a median key hue line being the key hue line rotated by half the hue rotation angle.

9. The device according to claim 7, wherein the key color is selected from a group of primary colors and a group of secondary colors.

10. The device according to claim 7, wherein projecting the key color is one of: an oblique projection, an orthogonal projection, a rotation around the center of the chroma plane, a rotation around the preserved key color.

11. The device according to claim 7, wherein, to obtain the preserved key color and the hue alignment angle of the key color, the device further comprises a receiver for receiving metadata relative to parameters used for invertible gamut mapping.

12. The device according to claim 7, wherein the color space is linear light YUV color space.

13. A non-transitory processor-readable medium having stored a standard dynamic range (SDR) video and metadata relative to parameters used for invertible gamut mapping, and further having stored instructions that are operative, when executed by a processor, to cause the processor to process the SDR video by gamut mapping from a first color gamut towards a second color gamut, wherein the first color gamut and the second gamut belong to a color space where a current color comprises a luminance value and two chroma values, the two chroma values comprising an angle representative of a hue and an absolute value representative of a saturation in a chroma plane, the gamut mapping comprising:

for each key color of at least three key colors, obtaining a preserved key color and one hue alignment angle for the key color, the hue alignment angle corresponding to the angle formed between the key color mapped into the second color gamut and key color in the first color gamut with respect to an origin in the chroma plane; and performing a hue mapping of the current color from the first color gamut towards the second color gamut comprising:
determining two adjacent key colors among the at least three key colors of the current color;

for each adjacent key color, determining a rotated key color by projecting the key color on a rotated hue line being a hue line through the key color rotated by the hue alignment angle from the origin in the chroma plane;

for each adjacent key color, determining a forward key hue line being a line through the key color and the preserved key color;

for each adjacent key color, determining a backward key hue line being a line through the rotated key color and the preserved key color;

determining a forward anchor at an intersection between the forward key hue line of the two adjacent key colors;

determining a backward anchor at an intersection between the backward key hue line of the two adjacent key colors;

determining a preserved current color at an intersection of a forward hue line between the current color and the forward anchor and a preservation line between the preserved key color of the two adjacent key colors; and determining the hue mapped current color, wherein:
when a saturation of the current color is below a saturation of the preserved current color, the hue mapped current color is the current color;

when the saturation of the current color is other than below the saturation of the preserved current color, the hue mapped current color is obtained by projecting the current color on a backward hue line defined by the preserved current color and the backward anchor;

wherein metadata relative to parameters used for invertible gamut mapping facilitates gamut mapping based on a hue mapping with a preserved area process that rotates the first color gamut into a rotated color gamut while leaving unchanged colors belonging to the preserved area.

\* \* \* \* \*